United States Patent
Yamada et al.

(10) Patent No.: US 10,147,516 B2
(45) Date of Patent: Dec. 4, 2018

(54) EXTRUDED FLEXIBLE FLAT CABLE

(71) Applicant: Yazaki Corporation, Tokyo (JP)

(72) Inventors: Maki Yamada, Susono (JP); Kazuya Goshima, Fuji (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 15/405,544

(22) Filed: Jan. 13, 2017

(65) Prior Publication Data
US 2017/0148544 A1 May 25, 2017

Related U.S. Application Data

(62) Division of application No. 13/583,658, filed as application No. PCT/JP2011/055009 on Feb. 25, 2011.

(30) Foreign Application Priority Data

Mar. 12, 2010 (JP) ................................ 2010-056017

(51) Int. Cl.
*H01B 7/08* (2006.01)
*B60R 16/02* (2006.01)
(Continued)

(52) U.S. Cl.
CPC .......... *H01B 7/0823* (2013.01); *B60R 16/02* (2013.01); *C08K 5/13* (2013.01); *C08K 5/5313* (2013.01); *H01B 7/295* (2013.01)

(58) Field of Classification Search
CPC ........ H01B 7/0823; H01B 7/295; H01B 3/30; H01B 7/02; H01B 7/04; H01B 7/08;
(Continued)

(56) References Cited

U.S. PATENT DOCUMENTS

| 4,105,622 A | 8/1978 | Izutu et al. |
| 4,208,321 A | 6/1980 | Sandler |

(Continued)

FOREIGN PATENT DOCUMENTS

| CN | 1226993 A | 8/1999 |
| CN | 1389877 A | 1/2003 |

(Continued)

OTHER PUBLICATIONS

Watanabe (EP 938099 A1) provided with Office Action.*
(Continued)

*Primary Examiner* — Chau N Nguyen
*Assistant Examiner* — Roshn K Varghese
(74) *Attorney, Agent, or Firm* — Locke Lord LLP; James E. Armstrong, IV; Nicholas J. DiCeglie, Jr.

(57) ABSTRACT

An extruded flexible flat cable, which has a superior formability, flexibility, adhesiveness, and fire-retardancy, with a low manufacturing cost, is adapted for sliding door of a motor vehicle and also other parts, and has a conductor covered with an insulation layer extrude-formed with an extrusion molding method, and the insulation layer formed from a fire-retardant resin composition containing a modified polybutylene terephthalate and a fire-retardant additive, where the fire-retardant resin composition has a melting point of 170-215 degrees C. measured in reference to JIS K7121 with a differential thermal analysis at a rate of temperature increase of 10 degrees C. per minute.

10 Claims, 1 Drawing Sheet

(51) Int. Cl.
    *C08K 5/13*     (2006.01)
    *C08K 5/5313*     (2006.01)
    *H01B 7/295*     (2006.01)

(58) Field of Classification Search
    CPC ...... C08K 3/0058; C08K 5/13; C08K 5/5313; B60R 16/02
    USPC .......................................... 174/117 F, 117 FF
    See application file for complete search history.

(56) References Cited

U.S. PATENT DOCUMENTS

| | | | |
|---|---|---|---|
| 5,644,105 | A | 7/1997 | Castellani |
| 5,780,534 | A * | 7/1998 | Kleiner ............... C07F 9/30 |
| | | | 524/133 |
| 6,229,044 | B1 | 5/2001 | Kleiner et al. |
| 6,361,724 | B1 * | 3/2002 | Maeda ............... B29C 47/76 |
| | | | 264/141 |
| 6,538,054 | B1 * | 3/2003 | Klatt ............... C08K 5/0066 |
| | | | 524/101 |
| 2002/0193552 | A1 | 12/2002 | Kiuchi et al. |
| 2003/0024729 | A1 | 2/2003 | Suzuki et al. |
| 2005/0137297 | A1 | 6/2005 | De Wit |
| 2008/0167406 | A1 | 7/2008 | Yamada |
| 2008/0277136 | A1 | 11/2008 | Reyes |
| 2009/0124733 | A1 | 5/2009 | Haruhara et al. |
| 2009/0130356 | A1 | 5/2009 | Moriuchi et al. |
| 2010/0056677 | A1 | 3/2010 | Janssen et al. |
| 2010/0068518 | A1 | 3/2010 | Honma et al. |
| 2011/0200811 | A1 | 8/2011 | Tsunoda et al. |

FOREIGN PATENT DOCUMENTS

| | | |
|---|---|---|
| CN | 1763132 A | 4/2006 |
| CN | 1763133 A | 4/2006 |
| CN | 101495564 A | 7/2009 |
| CN | 101512679 A | 8/2009 |
| EP | 0938099 A1 | 8/1999 |
| JP | 09-208906 A | 8/1997 |
| JP | 09-279101 A | 10/1997 |
| JP | 10-086207 A | 4/1998 |
| JP | 10-278206 A | 10/1998 |
| JP | 2002-343141 A | 11/2002 |
| JP | 2011-034703 A | 2/2011 |

OTHER PUBLICATIONS

English Machine Translation of Hanabusa (CN 1763132 A) provided with Office Action (Espacenet).*
English Machine Translation of Hanabusa (CN 1763132 A) provided with Office Action (Google).*
Original Hanabusa (CN 1763132 A) provided with Office Action.*
International Search Report and Written Opinion of the International Searching Authority dated May 31, 2011, issued for PCT/JP2011/055009.
Notification of the First Office Action dated Jan. 28, 2014, issued for the Chinese patent application No. 201180013753.0 and English translation thereof.
Office Action dated Sep. 28, 2014, issued for the Chinese patent application No. 201180013753.0 and English translation thereof.
Office Action dated Jun. 3, 2015, issued for the Chinese patent application No. 201180013753.0 and English translation thereof.
Machine Translation of Hanabusa CN1763132A.

* cited by examiner

EXTRUDED FLEXIBLE FLAT CABLE

TECHNICAL FIELD

The present invention relates to a flexible flat cable, which can be utilized for an electrical connection between a movable portion such as a door and a stationary portion such as a main body of a motor vehicle.

RELATED ART

A flexible flat cable is flexible, thin and rollable, and thus utilized for an electrical connection between a stationary portion and a movable portion of a wide range of devices such as a scanner head, a printer head, and a clock spring of a motor vehicle.

The conventional flexible flat cable is manufactured with a laminate method (JP H10-278206 A). A conductor arranged on a base sheet, of a fire-retardant saturated polyester resin is covered with a heat seal resin layer to form a composite sheet.

The heat seal layer has a high flexural fatigue property and a sufficient adhesiveness to the conductor.

The conventional method thus includes the steps of manufacturing the base sheet, forming the heat seal layer, and laminating together. The method for manufacturing the conventional flexible flat cable has many steps compared to a general extrusion method utilized in production of a sheathed electrical cable, resulting in a high production cost. The flexible flat cable prepared by the laminate method has been utilized in a clock spring of the motor vehicle since the extremely high flexibility, for example at least 10 million cycles, is required. However, the flexible flat cable prepared with the laminate method has been rarely adapted for use of a door such as a sliding door.

DISCLOSURE OF THE INVENTION

An object of the present invention is to provide an extruded flexible flat cable having a superior formability, flexibility, adhesiveness and fire-retardancy, and being manufactured with a low cost. The flexible flat cable of the present invention is thus adapted for use in a motor vehicle such as an electrical connection between a sliding door and a vehicle body.

According to a first aspect of the present invention, an extruded flexible flat cable has a conductor covered with an insulation layer extrude-formed with an extrusion molding method, the insulation layer being formed from a fire-retardant resin composition containing a modified polybutylene terephthalate and a fire-retardant additive, the fire-retardant resin composition having a melting point of 170-215 degrees C. measured with a differential thermal analysis at a rate of temperature increase of 10 degrees C. per minute and in reference to JIS K7121.

Preferably, the insulation layer around the conductor is formed with an extrusion molding machine by extruding a single layer of the fire-retardant resin composition around the conductor supplied to a cross head of the extrusion molding machine.

Preferably, the conductor has a thickness of at least 0.1 mm and the flat cable has a flexion cycle of at least $7*10^4$ measured with a flexibility test in reference to JIS C60695-11-10A.

Preferably, the extruded flexible flat cable is adapted for electrical connection between a movable portion and a stationary portion of a motor vehicle.

BEST MODE FOR CARRYING OUT THE INVENTION

Figure 1A:
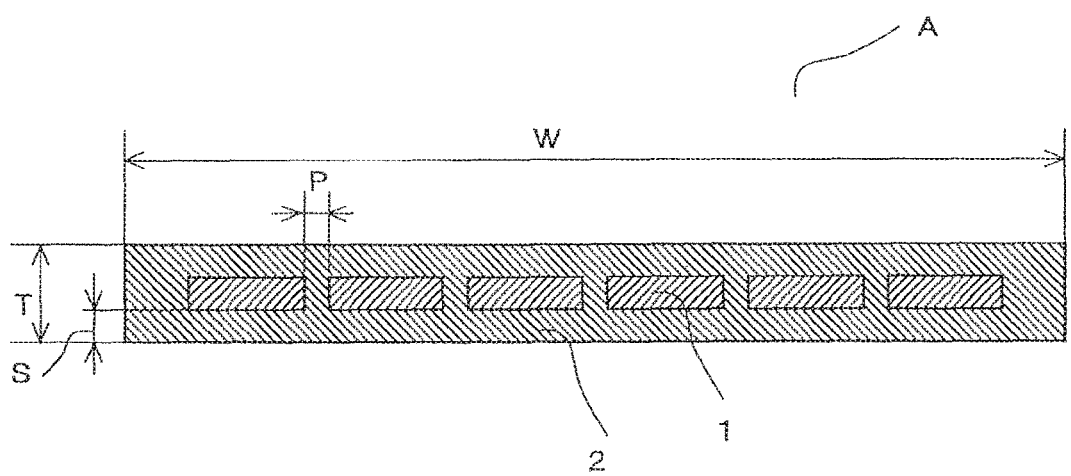
FIG. 1A and FIG. 1B are schematic sectional views of an extruded flexible flat cable of the present invention.

An extruded flexible flat cable of the present invention has a conductor covered with a fire-retardant resin composition extruded with an extrusion molding method. The fire-retardant resin composition contains a modified polybutylene terephthalate and a fire-retardant additive. The fire-retardant resin composition has a melting point of 170-215 degrees C. measured with a differential thermal analysis with a rate of temperature increase of 10 degrees C. per minute in reference to JIS K7121.

The fire-retardant resin composition may contain an anti-oxidizing agent, a heat-resistant stabilizer and other additives, if necessary, without impairing the suitable properties of the flat cable. The addition of the anti-oxidizing agent and the heat-resistant stabilizer is preferable for thermal stability when the cable is machined or used.

The polybutylene terephthalate (PBT) is homopolyester or copolyester (polybutylene terephthalate, polybutylene terephthalate copolyester) containing butylene terephthalate as a main component. The present invention utilizes a modified polybutylene terephthalate (modified PBT) of the copolyester.

Copolymerizable monomer (also referred to copolymerization monomer) of the modified PBT is at least one selected from dicarboxylic acid except terephthalic acid, diol except 1,4-butanediol, oxycarboxylic acid, and lactone.

The dicarboxylic acid is, for example, aliphatic dicarboxylic acid (e.g., succinic acid, glutaric acid, adipic acid, pimelic acid, suberic acid, azelaic acid, sebacic acid, undecanoic dicarboxylic acid, dodecane dicarboxylic acid, hexadecane dicarboxylic acid, dimer acid, which are the (C4-C40)dicarboxylic acid, preferably (C4-C14)dicarboxylic acid, where Cm-Cn indicates a number of carbon atoms of m to n contained in the related component), alicyclic dicarboxylic acid (e.g., hexahydro-phthalic acid, hexahydro-isophthalic acid, hexahydro-terephthalic acid, himic acid, which are (C8-C12)dicarboxylic acid), aromatic series dicarboxylic acid except terephthalate acid (e.g., phthalic acid, isophthalic acid, 2,6-naphthalene dicarboxylic acid, 4-4'-diphenyl dicarboxylic acid, 4-4'-diphenoxy ether dicarboxylic acid, 4-4'-diphenyl ether dicarboxylic acid, 4-4'-diphenyl methane dicarboxylic acid, 4-4'-diphenyl ketone dicarboxylic acid, which are (C8-C16)dicarboxlic acid, or reactive derivatives thereof (ester forming derivatives, e.g., (C1-C4)alkyl esterof phthalic acid or isophthalic acid such as lower alkyl ester (e.g., dimethyl phthalic acid, dimethyl isophthalic acid (DMI)), acid chloride, acid anhydride). Multivalent carboxylic acid such as trimellitic acid and pyromellitic acid can be combined together.

The diol is aliphatic alkylene glycol excepting 1,4-butanediol (e.g., ethylene glycol, trimethylene glycol, propylene glycol, neopentyl glycol, hexanediol, octanediol, decanediol, which are (C2-C12)alkanediol, preferably (C2-C10) alkanediol), polyoxyalkylene glycol, which is glycol containing a plurality of oxy(C2-C4)alkylene units (e.g., diethylene glycol, dipropylene glycol, ditetramethylene glycol, triethylene glycol, tripropylene glycol, polytetramethylene glycol), aliphatic diol (e.g., 1,4-cyclohexanediol, 1,4-cyclohexanedimethanol, hydrogenated bisphenol-A), aromatic series diol (e.g., (C6-C14)aromatic series diol (e.g., hydroquinone, resorcinol, naphthalenediol), biphenol, bisphenol, xylylene glycol). Polyol such as glycerin, trimethylolpropane, trimethylolethane, pentaerythritol can be mixed together if necessary The bisphenol is bis(4-hydroxyphenyl) methane (bisphenol F), 1,1-bis(4-hydroxyphenyl) ethane (bisphenol AD), 1,1-bis(4-hydroxyphenyl) propane, 2,2-bis(4-hydroxyphenyl) propane (bisphenol A), 2,2-bis(4-hydroxy-3-methylphenyl) propane, 2,2-bis(4-hydroxyphenyl) butane, 2,2-bis(4-hydroxyphenyl)-3-methylbutane, 2,2-bis(4-hydroxyphenyl) hexane, 2,2-bis(4-hydroxyphenyl)-4-methylpentane, which are bis(hydroxyaryl) (C1-C6)alkane, 1,1-bis(4-hydroxyphenyl) cycropentane, 1,1-bis(4-hydroxyphenyl) cycrohexane, which are bis(hydroxyaryl) (C4-C10) cycroalkane, 4,4'-dihydroxydiphenyl ether, 4,4'-dihydroxydiphenyl sulfone, 4,4'-dihydroxydiphenyl sulfide, 4,4'-dihydroxydiphenyl ketone, and their alkylene oxide adducts, The alkylene oxide adduct is (C2-C3)alkylene oxide adduct of bisphenol (e.g., bisphenol A, bisphenol AD, bisphenol F), 2,2-bis[4-(2-hydroxyethoxy) phenyl] propane, diethoxynized bisphenol A (EBPA), 2,2-bis[4-(2-hydroxypropoxy) phenyl] propane, dipropoxynized bisphenol A.

In the alkylene oxide adduct, the adduction moles of the (C2-C3)alkylene oxide (ethylene oxide, propylene oxide) is 1-10 moles to the respective hydroxyl group, preferably 1-5 moles.

The oxycarboxylic acid is hydroxybehzoic acid, oxynaphthoic acid, hydroxyphenyl acetic acid, glycolic acid, oxycaproic acid or derivatives thereof. The lactone is propiolactone, butyrolactone, valerolactone, caprolactone (e.g., s-type), which are (C3-C12)lactone.

The preferable copolymerizable monomer is diol (e.g., a straight-chain or branched chain (C2-C6)alkylene glycol such as ethylene glycol, trimethylene glycol, propylene glycol, hexanediol, polyoxy(C2-C4)alkylene glycol4 having 2-4 repeated oxyalkylene units (e.g., diethylene glycol), bisphenol (e.g., bisphenol or alkylene oxide adduction thereof)), dicarboxylic acid (e.g., (C6-C12)aliphatic dicarboxylic of C6-C12 such as adipic acid, pimelic acid, suberic acid, azelaic acid, sebacic acid, asymmetric aromatic group dicarboxylic acid wherein the carboxyl group is substituted in the asymmetric position of arene ring, 1,4-cyclohexane dimethanol). Among these compounds, the aromatic series (e.g., alkylene oxide adduct of bisphenol (especially A), and asymmetric aromatic series dicarboxylic acid (e.g., phthalic acid, isophthalic acid, and lower alkyl ester such as their reactive derivatives (e.g., dimethyl isophthalic acid (DMI)) are preferable.

The especially suitable copolymerization monomer is isophthalic acid and its reaction derivative (lower alkyl ester, e.g., dimethyl isophthalic acid) due to easy obtention, easy polymerization, and easy control of the copolymer component.

The copolymerization monomer is included by 6-30 mole percent (amount of modification). The amount of the copolymerization monomer can be in the range of 0.01-40 mole percent. When the copolymerization monomer is included by less than 6 mole percent, the melting point becomes at least 215 degrees C. and the flexibility of the flat cable is reduced.

When the copolymerization monomer is included by at least 30 mole percent, the melting point becomes less than 170 degrees C. and the extrusion becomes difficult to obtain a uniform cable.

The modified PBT is manufactured with a conventional method (e.g., ester exchange or direct esterization) by copolymerizing the terephthalic acid or its reaction derivative, and a monomer copolimerizable with 1,4-butanediol.

The fire-retardant resin composition of the flat cable contains the fire-retardant additive, which is halogen fire-retardant additive, halogen free fire-retardant additive such as organic/inorganic acid, or the combination thereof. When a bromine fire-retardant additive is included in the component, a suitable handling in accordance with WEEE instruction (instruction for used electric and electronic devices) is required. Thus, the organic/inorganic acid salt is preferable.

Organic halogen compounds can be used as the halogen fire-retardant additive. The organic halogen compound usually contains at least one selected from chlorine, bromine and iodine atom.

The halogen fire-retardant additive is halogen containing acrylate resin (halogenated polybenzyl (meta) acrylate resin (e.g., brominated polybenzyl poly(meta) acrylate such as pentabromobenzyl (meta) acrylate, halogenated benzyl (meta) acrylate such as poly(pentachlorobenzyl (meta) acrylate, or copolymer thereof, halogen containing styrene resin (e.g., brominated polystyrene or halogenated polystyrene, which is formed by subjecting the styrene resin (single or copolymer) to halogenated treatment of halogen, bromine, or the combination thereof), halogen containing polycarbonate resin of single or copolymer of the halogenated styrene monomer (e.g., brominated polycarbonate and halogenated polycarbonate), halogen containing epoxy compound (e.g., halogenated epoxy resin such as brominated epoxy resin, halogenated epoxy resin and halogenated phenoxy resin such as brominated phenoxy resin), halogenated polyaryl ether compound (e.g., halogen containing polyphenylene oxide resin such as octa-deca bromodiphenyl ether, bis (halogenated aryl) ether (e.g., bis(halogenated phenyl) ether), brominated polyphenylene ether), halogenated aromatic series imide compound (e.g., alkylene brominated phthalic imide such as (C2-C6)alkylene bisbrominated phthalic imide, borminated aromatic series imide compound (e.g., bisimide compound)), halogenated bisaryl compound (e.g., bishalogenated (C6-C10)aryl such as brominated diphenyl, bis(halogenated(C6-C10)aryl)(C1-C4)alkane, halogenated bisphenol or its derivative of brominated bisphenol A (e.g., brominated polyester polymerized with ethylene oxide adduct such as halogenated bisphenol), halogenated alicyclic carbon hydride (e.g., link-ring saturated or unsaturated halogenated alicyclic carbon hydride such as halogenated polycycro alkadiene of dodeca-chloro-pentacyclo-octadeca-7,15-diene), halogenated tri(aryloxy) triazine compound (e.g., brominated tri(azoleoxy) triazine compound such as brominated triphenoxytriazine). The halogen fore-retardant additive can be utilized solely or combined together.

The fire-retardant resin composition contains 1-30 parts by weight, preferably 2-25 (or 2-20) parts by weight, more preferably 3-20 (or 5-18) parts by weight of the halogen fire-retardant additive with respect to 100 parts by weight of the modified PBT.

The organic/inorganic acid salt is at least one selected from organic phosphinate or oxo acid salt of basic nitrogen containing compound (salt of oxo acid and basic nitrogen containing compound).

The organic phosphinate is organic group (e.g., hydrocarbon radical containing the substitutional group), and organic phosphinic acid salt (e.g., multivalent phosphinic acid linked with multivalent organic group together). The organic phosphinic acid salt is at least one selected from salt components of metal, boron, ammonium and basic nitrogen containing compound (metal salt, boron salt (boryl compound), ammonium salt, amino group/nitrogen containing compound).

Use of the organic phosphinate with the halogen fire-retardant additive improves electrical property.

The organic phosphinate functions as an agent to improve the electrical property. The organic phosphinic acid of the organic phosphinate may contain substitutional group (e.g., hydroxyl group, carbon-oxygen unsaturated bond containing group such as carboxyl group, acyl group, alkoxycarbonyl group (methoxycarbonyl group), hydrocarbon radical (e.g., alkyl group such as methyl group), alkoxy group (e.g., methoxy group). The organic phosphinic acid can contain at least one of the above substitutional groups.

Typical organic phosphinic acid of the organic phosphinate is 1) mono or dialkyl phosphinic acid, which may contain the substitutional group (dialkyl phosphinic acid such as di(C1-C10)alkyl phosphinic acid), (e.g., dimethyl phosphinic acid, methyl ethyl phosphinic acid, diethyl phosphinic acid, ethyl butyl phosphinic acid (e.g., ethyl n-butyl phosphinic acid, ethyl isobutyl phosphinic acid, ethyl t-butyl phosphinic acid), dipropyl phosphinic acid (e.g., di-n-propyl phosphinic acid, diisopropyl phosphinic acid), dibutyl phosphinic acid (e.g., di-n-butyl phosphinic acid, diisobutyl phosphinic acid, di-t-butyl phosphinic acid), dialkyl phosphinic acid such as dioctyl phosphinic acid, hydroxyl group containing dialkyl phosphinic acid such as (hydroxyethyl) phosphinic acid, carboxyl group containing dialkyl phosphinic acid such as (2-carboxyethyl) methyl phosphinic acid, (methoxymethyl) methyl phosphinic acid, (2-carboxypropyl) methyl phosphinic acid, bis(2-carboxyethyl) phosphinic acid, carboxyl group containing dialkyl phosphinic acid such as bis(2-carboxypropyl) phosphinic acid, (2-methoxycarbonylethyl) methyl phosphinic acid, (2-β-hydroxyethylcarbonylethyl) methyl phosphinic acid, (2-methoxycarbonylpropyl) methyl phosphinic acid, bis(2-methoxycarbnylethyl) phosphinic acid, bis(2-methoxycarbnylpropyl) phosphinic acid, which are alkoxycarbonyl group containing dialkyl phosphinic acid), 2) mono or dicycroalkyl phosphinic acid, which may contain the substitutional group, (e.g., cycroalkylalkyl phosphinic acid such as cycrohexylmethyl phosphinic acid, dicycroalkyl phosphinic acid, which are mono or di(C5-C10) cycroalkyl phosphinic acid), 3) mono or diaryl phosphinic acid, which may contain the substitutional group (e.g., (C6-C10)aryl phosphinic acid such as phenyl phosphinic acid, (C1-C10)aryl phosphinic acid such as diphenyl phosphinic acid, alkylaryl phosphinic acid (e.g., (C1-04) such as methylphenyl phosphinic acid, alkyl-(C5-C10)aryl phosphinic acid)), 4) alkylene phosphinic acid, which may contain the substitutional group (e.g., 1-hydroxyphosphoranel-oxide, 1-hydroxy-3-methyl-phosphoranel-oxide, 2-carboxy-1-hydroxy-1H-phosphoranel-oxide, which are (C3-C8)alkylene phosphinic acid), 5) alkenylene phosphinic acid, which may contain the substitutional group (e.g., 1-hydroxy-2, 3-dihydro-1H-phospholel-oxide, 1-hydroxy-3-methyl-2, 5-dihydro-1H-phospholel-oxide, which are cyclo(C3-C8)alkenylene phosphinic acid), 6) (bi)cycloalkylene phosphinic acid, which may contain the substitutional group (e.g., 1,3-cyclobutylene phosphinic acid, 1,3-cyclopentylene phosphinic acid, 1,4-cyclooctylene phosphinic acid, 1,5-cycrooctylene phosphinic acid, which are bi(C4-010)cycloalicyclic alkylene phosphinic acid), 7) bicycloalkenylene phosphinic acid, which may contain the substitutional group, 8) multivalent phosphinic acid containing a plurality of phosphinic acids (organic phosphinic acid) connected together with the multivalent organic group (e.g., alkane-bis-phosphinic acid, which may contain the substitutional group such as ethane-1,2-bis(phosphinic acid, which is (C1-C10)alkane-bis-phosphinic acid, alkane-bis-(alkyl phosphinic acid), which may contain the substitutional group such as ethane-1,2-bis-(methyl phosphinic acid), which is (C1-C10)alkane-bis-(C1-C6)alkane phosphinic acid).

Metals forming the organic phosphinate are Group 1 metal (alkaline metal such as Li, Ka, Na), Group 2 metal (alkaline-earth metal such as Mg, Ca, Ba), Group 4 metal (Ti, Zr), transition metal (Group 7 metal such as Mn, Group 8 metal such as Fe, Group 9 metal such as Co, Group 10 metal such as Ni, Group 11 metal such as Cu), Group 12 metal such as Zn, Group 13 metal such as Al, Group 14 metal such as Sn, Group 15 metal such as Sb. These metals can be used solely or combined together. The metal salt is hydrate salt such as hydrate magnesium salt, hydrate calcium salt, hydrate aluminum salt, hydrate zinc salt. The metal salt also includes a partially oxidized salt such as titanyl salt and zirconyl salt.

The basic nitrogen containing compound forming salt is nitrogen-containing compound with amino group such as aminotriazine compound (melamine, guanamine, benzoguanamine and/or their condensate such as melam, melem, melon), guanidine compound such as guanidine, and urea compound such as urea. At least one selected from the basic nitrogen containing compound is utilized. The salt forming component may include at least one selected from the above. The organic phosphinate is a double salt of the organic phosphinic acid and a plurality of salt forming components. Examples are melamine-melam-melem double salt and melamine-melam-melem-melon double salt.

The 1-2, 4, 7-8, 10-15 Group metal and amino triazine compound (e.g., melamine, melamine condensate) are preferable to form the salt.

In the saturated organic phosphinate, the organic phosphinic acid with acid radical (e.g., carboxyl group) as the substitutional group may form a part or total salt (e.g., metal salt described above or nitrogen containing compound salt same as the phosphinic acid).

The preferable organic phophinate is formed with the following organic phopshinic acid and the following salt. The organic phosphinic acid is selected from aliphatic phosphinate, which may contain the substitutional group and/or alicyclic phosphinate, which may contain the substitutional group, dialkyl phosphinic acid, which may contain the substitutional group, dicycloalkyl phosphinic acid, which may contain the substitutional group, alkylene phosphinic acid, which may contain the substitutional group, alkenylene phosphinic acid, which may contain the substitutional group, (bi)cycloalkylene phosphinic acid, which may contain the substitutional group, and alkane bis(alkyl phosphinic acid), which may contain the substitutional group). The salt is selected at least one from Group 1-2, 4, 7-8, 10-15 metal and aminotriazine compound. The dialkyl phosphinate is alkaline-earth metal salt (e.g., dimethyl phosphinic acid Ca salt, diethyl phosphinic acid Ca salt, ethylbutyl phosphinic acid Ca salt, dibytyl phosphinic acid Ca salt, (2-carboxyethyl) methyl phosphinic acid Ca salt, (2-carboxypropyl) methyl phosphinic acid Ca salt, bis(2-carboxyethyl) phosphinic acid Ca salt, bis(2-carboxypropyl) phosphinic acid Ca salt), aluminum salt (e.g., dimethyl phosphinic acid Al salt, methyl ethyl phosphinic acid Al salt, diethyl phosphinic acid Al salt, ethyl butyl phosphinic acid Al salt, dibutyl phosphinic acid Al salt, (2-carboxyethyl) methyl phosphinic acid Al salt, (2-carboxypropyl) methyl phosphinic acid Al salt, bis(2-carboxyethyl) methyl phosphinic acid Al salt, bis(2-carboxypropyl) phosphinic acid Al salt), titanium salt (e.g., methyl ethyl phosphinic acid Ti salt, diethyl phosphinic acid Ti salt, ethyl butyl phosphinic acid Ti salt, dibutyl phosphinic acid Ti salt, titanyl salt thereof), zinc salt (e.g., diethyl phosphinic acid Zn salt, ethyl butyl phosphinic acid Zn salt, dibutyl phosphinic acid Zn salt, methyl ethyl phosphinic acid Zn salt, (2-carboxyethyl) methyl phosphinic Zn acid), amino triazine compound salt (e.g., dimethyl phosphinic acid melamine salt, methyl ethyl phosphinic acid melamine salt, diethyl phosphinic acid melamine salt, ethyl butyl phosphinic acid melamine salt, dibutyl phosphinic acid melamine salt, melamine-melam-melem double salt thereof). The alkylene phosphinate, which may contain the situational group, is 1-hydroxy phosphoranel-oxide metal salt (alkaline-earth metal (Ca, Mg) salt, aluminum salt, titanium salt, titanyl salt, zinc salt), and amino triazine salt such as melamine salt, melamine-melam-melem double salt.

The most preferable organic phosphinate contains the organic phosphinic acid selected from dialkyl phosphinic acid, dicyclo alkyl phosphinic acid, alkylene phosphinic acid, alkenylene phosphinic acid, and alkane bis(alkyl phosphinic acid), all of which may contain the substitutional group, and at least one salt selected from Group 2 metal (e.g., Ca), Group 13 metal (e.g., Al), aminotriazine compound (melamine, melam, melem, melon). The organic phosphinate can be utilized solely or combined together.

The specific organic phosphinate is disclosed in JP S55-5979 A, JP H8-73720 A, JP H9-278784 A, JP H11-236392 A, JP 2001-2686 A, JP 2004-238378 A, JP 2004-269526 A, JP 2004-269884 A, JP 2004-346325 A, JP 2001-513784 A, JP 2001525327 A, JP 2001-525328 A, JP 2001-525329 A, JP 2001-540224 A, U.S. Pat. Nos. 4,180,495, 4,208,321, 4,208,322, 6,229,044, 6,303,674.

The oxo acid (except the organic phosphinic acid) of the oxo acid salt is nitric acid, chloric acid (perchloric acid, chloric acid, chlorous acid, hypochlorous acid), phosphoric acid (non-condensed phosphoric acid such as orthophosphoric acid, metaphosphoric acid, phosphorous acid, hypophosphorous acid, and condensed phosphoric acid (polyphosphoric acid) such as pyrophosphoric acid, triphosphoric acid, tetraphosphoric acid, polymetaphosphate, anhydrous phosphoric acid (diphosphor pentoxide)), organic phosphoric acid (a partial ester of alcohol such as alkanol, arkylene glycol with the phosphoric acid except hypophosphorous acid, e.g., mono or dialkyl phosphite such as dimethyl phosphite), sulfuric acid (non-condensed sulfuric acid such as peroxomonosulfuric acid, sulfuric acid, sulfurous acid, and condensed sulfuric acid such as peroxodisulfuric acid, pyrosulfuric acid), boric acid (non-condensed boric acid such as orthoboric acid, metaboric acid, and condensed boric acid such as tetraboric acid, anhydrous boric acid), chromic acid, antimonic acid, molybdic acid, tungstic acid. These oxo acids can be utilized solely or combined together.

Among the oxo acids, the condensed phosphoric acid (pyrophosphoric acid, polyphosphoric acid, polymetaphosphate), sulfuric acid, condensed sulfuric acid (pyrophosphoric acid) are preferable.

The basic nitrogen containing compound of the oxo acid is a nitrogen containing compound (chain or cyclic compound) having hydrogen atom bonding to nitrogen atom (e.g., namely active hydrogen atom such as hydrogen atom of amino group ($-NH_2$), imino group ($-NH-$)), ammonia, urea compounds (e.g., urea), guanidine compound (e.g., dicyandiamide, guanidine, guanyl urea), and aminotriazine compound (e.g., melamine, guanamine, benzoguanamine, and/or the condensate such as melamine condensate of melam, melem, melon). These nitrogen containing compounds can be used solely or combined together. Among the nitrogen containing compounds, ammonia, urea, guanidine, dicyandiamide, melamine, melamine condensate (melam, melem, melon) are preferable.

The oxo acid salt can be polycondensate as far as the reaction (calcined) product of the oxo acid and the basic nitrogen containing compound. The polycondensate of the oxo acid and the nitrogen containing compound is the polycondensate of the oxo acid and/or the salt of the oxo acid and the nitrogen containing compound, and cyanamide derivative compound having a unit of ($-N=C=N-$ or $-N=C(-N<)_2$) such as triazine compound (e.g., melamine) and guanidine compound. The polycondensate is obtained by calcining and condensing the oxo acid, the cyanamide derivative, if necessary, with a bonding agent (e.g., urea and/or oxo acid urea). The polycondensate is usually polymer compound containing the amide bonding. The oxo acid of the polycondensate is phosphoric acid, organic phosphoric acid, and the phosphate of the above nitrogen containing compound (e.g., polyphosphoric acid ammonium, urea phosphate), especially condensed phosphoric amide (or polyphosphoric acid amide formed with the organic phosphoric acid and/or condensed phosphoric acid). The boding agent of the amide polyphosphate is urea and/or urea phosphate. The above polycondensate can be used solely or combined together. The amide polyphosphate is disclosed in JP H7-138463 A. JP S51-39271 and JP S53-2170 disclose methods of manufacturing the amide polyphosphate. The amide polyphosphate is available as a commercial product (Sumisafe PM; Product of Sumitomo Chemical Co., LTD., Taien S; Product of Taihei Chemical Industrial Co., LTD.).

The preferable oxo acid salt is salt of polyphosphoric acid and aminotriazine compound (e.g., melamine polyphosphate), melam polyphosphate, salt of polyphosphoric acid (e.g., melem polyphosphate) and melamine and/or melamine condensate (especially melamine or melamine condensate), salt of sulfuric acid and aminotriazine compound (e.g., salt of sulfuric acid such as (di)melamine sulfate, (di)melam sulfate, melamine-melam-melem double salt sulfate, and melamine and/or melamine condensate), salt of pyrosulfuric acid and aminotriazine compound (e.g., pyrosulfuric acid such as (di)melamine pyrosulfuric acid, (di)melam pyrosulfuric acid, (di)melem pyrosulfuric acid, melamine-melam-melem double salt pyrosulfuric acid), and melamine and/or melamine condensate), condensed amide phosphate (or amide polyphosphate).

The molar ratio of the oxo acid to the nitrogen containing compound in the oxo acid salt is 1/0.5-1/5, preferably 1/0.7-1/4, and more preferably 1/0.8-1/3.

These oxo acid salts improve the electrical properties of the resin for the halogen fire-retardant resin. The oxo acid salt effects the improvement of the electrical properties.

The organic phosphinate among the organic/inorganic salts is most suitable with respect to stability of the compound (easiness of storage), easy machinability, quality of the product (product appearance and surface seeping of the product), durability of product, thermal stability. Salt of Ca, Mg and Al of the lower alkyl phosphinic acid (e.g., dimethyl phosphinic acid, methyl ethyl phosphinic acid, diethyl phosphinic acid, ethyl butyl phosphinic acid, dibutyl phosphinic acid) is more preferable.

The organic/inorganic acid salt can be used solely or combined together. The organic phosphinate and/or the oxo acid salt for the organic/inorganic acid salt are suitable for improving the electrical properties. The weight ratio of the organic phophinate to the oxo acid salt is 99/1-1/99, preferably 95/5-5/95, more preferably 90/10-10/90.

The compounding ratio of the organic/inorganic salt to the modified PBT (in parts by weight) is 1-60 (e.g., 2-50)/100, preferably 3-40 (e.g., 4-35)/100, more preferably 3-30 (e.g., 8-25)/100.

When the halogen fire-retardant additive and the organic/inorganic acid salt are utilized together, the parts by weight ratio of the organic/inorganic acid salt to the halogen fire-retardant additive is 5-500/100, preferably 10-350/100, more preferably 20-300 (e.g., 30-280)/100, especially 40-270/100, and 20-500/100.

The anti-oxidizing agent is 1) hindered phenol compound (hindered phenol anti-oxidizing agent), e.g., 2,6-di-t-butyl-p-cresol, 2,2'-methylene bis(4-methyl-6-t-butyl phenol, 2,2'-thio bis(4-methyl-6-t-butyl phenol, 4,4'-thio bis(6-t-butyl-m-cresol, triethylene glycol-bis(3-t-butyl-5-methyl-4-hydroxy phenyl) propionate, pentaerythritol-tetrakis(3-(3,5-di-t-butyl-4-hydoxy phenyl) propionate, which are branch (C3-C6)alkyl phenol, 2) phosphor compound (phosphoric anti-oxidizing agent) e.g., phosphite (bis ((C1-C9)alkyl-aryl) pentaerythritol diphosphite such as phosphite (bis (2,4-di-t-butyl phenyl) pentaerythritol diphosphite, and phosphonite (tetrakis (2,4-di-t-butyl phenyl)-4,4'-biphenylene diphosphite), 3) sulfuric compound (sulfuric anti-oxidizing agent) (e.g., dilauryl thiodipropyonate), 4) amine compound (amine anti-oxidizing agent) of hindered amine, e.g., naphthylamine, phenylnaphtylamine, 1,4-phenyleneamine, bis(2,2,6,6-tetramethyl-4-piperidyl) sebacate, bis (1,2,2,6,6-penatmethyl-4-piperidyl) sebacate, 5) hydroquinone compound (hydroquinone anti-oxidizing agent), e.g., 2,5-di-t-butylhydroquinone, 6) quinoline compound (quinoline anti-oxidizing agent), e.g., 6-ethoxy-2,2,4-trimethyl-1, 2-dihydro quinoline. The heat-resistant stabilizer is 1) alkali or alkaline-earth metal compound such as alkali hydrogen phosphate. or alkaline-earth metal salt (e.g., magnesium dihydrogen phosphate, calcium dihydrogen phosphate, calcium monohydrogen phosphate (dicalcium phosphate, $CaPO_4$), barium dihydrogen phosphate, barium monohydrogen phosphate, which are alkaline-earth metal salt (mono or di)hydrogen phosphate, 2) inorganic metal or mineral stabilizer (hydrotalcite, zeolite).

The anti-oxidizing agent and the heat-resistant stabilizer can be used solely or combined together.

The hindered phenol compound is suitable for the heat-resistant stabilizer. The hindered phenol compound can be used solely or combined with at least one selected from phosphate compound, alkali or alkaline-earth metal compound, and hydrotalcite.

A compounding ratio of the anti-oxidizing agent and the heat-resistant stabilizer to 100 parts by weight of the base resin is 0-15 parts by weight (e.g., 0.001-10 parts by weight), preferably 0.01-5 parts by weight, more preferably 0.05-2 parts by weight. When the hindered phenol compound is combined with other heat-resistant stabilizer, the compounding ratio, in weight, of the hindered phenol compound to the heat-resistant stabilizer is, 99/1-1/99, preferably 98/2-10/90, more preferably 95/5-20/80.

The polyester resin composition of the flat cable sheath of the present invention may include other polymer, plasticizer, inorganic filler, vulcanizing (cross-linking) agent, pigment, light stabilizer, antistatic agent, anti-blocking agent, lubricant, dispersing agent, liquidity modifying agent, mold-releasing agent, nucleation forming agent, and neutralizing agent. The amount of the additives and the polymer is 0.01-50 parts by weight with respect to 100 parts by weight of the polyester resin composition of the flat cable sheath of the present invention.

The fire-retardant resin composition of the flat cable sheath of the present invention can be a mixture of powder, a molten mixture, or a mold body (sheet or film) from the molten mixture. The mixture of powder is adjusted by mixing the modified PBT, the fire-retardant additive, and if necessary, the additive and/or other resin compositions with a conventional method. There are several methods to adjust the powder mixture. 1) Each component is firstly mixed and the mixture is extruded with single axle or two-axle extruder to form pellets for molding the final product. 2) Several kinds of pellets (master batch) different from the final composition are prepared and the mixture is further adjusted with a certain amount of respective pellets to obtain the final composition for molding the final product. 3) Each component can be supplied to the molding machine to obtain the final composition.

The flexible flat cable of the present invention is manufactured with the extrusion molding machine with high productivity and low cost compared to the conventional laminate method. A single or a plurality of conductors arranged parallel to one another is supplied to a cross head of the extrusion molding machine and the insulation layer of the fire-retardant resin composition is formed around the conductor(s) with the single layer-forming extrusion.

The conductors may have a single core or multi cores with different sizes. When the plurality of the conductors are used, the conductors are arranged parallel to one another. A bridge can be utilized to adjust the spacing between the conductors.

The cover layer may have any thickness and width unless the flexibility of the flat cable is limited.

The mixing and melting of the powder of the resin composition and the other component improves quality of the molded article due to improvement of dispersion of the respective components.

The melting point of the polyester resin composition of the flat cable sheath was measured with a differential thermal analysis (DSC) in reference to JIS K7121. Each pellet sample (about 5 mg) formed by mixing and extruding the final composition was set in, the DSC equipment, kept at degrees C. for 5 minutes, to stabilize the equipment, heated up to 280 degrees C. at a rate of 10 degrees C./min. The melting point was determined from the top peak of an endothermic reaction.

EXAMPLES

An embodiment of an extruded flexible flat cable of the present invention is explained below in detail. The present invention is not limited to the embodiment explained.

Preparation of Fire-Retardant Resin Composition:

Five kinds (PBT1-PBT5) of modified polybutylene terephthalate were prepared.

PBT 1:

A dicarboxylic acid containing terephthalic acid and isophthalic acid with a mole ratio of 87.5/12.5, and 1,4-butanediol as diol component were reacted to form a modified polybutylene terephthalate copolymer (melting point; 205 degrees C., melt index; 15 g/10 min).

PBT 2:

A dicarboxylic acid containing terephthalic acid and isophthalic acid with the mole ratio of 75/25, and 1,4-butanediol as diol component were reacted to form the modified polybutylene terephthalate copolymer (melting point; 180 degrees C., melt index; 25 g/10 min).

PBT 3:

The PBT 1 and the PBT 2 with the weight ratio of 1:1 were reacted to form the modified polybutylene terephthalate copolymer mixture (melting point; 190 degrees C., melt index; 20 g/10 min).

PBT 4:

A polybutylene terephthalate (melting point; 224 degrees C., melt index; 25 g/10 min).

PBT 5:

A dicarboxylic acid containing terephthalic acid and isophthalic acid with the mole ratio of 70/30, and 1,4-butanediol as diol component were reacted to form a modified polybutylene terephthalate copolymer (melting point; 168 degrees C., melt index; 25 g/10 min).

The melt index (MFR) was measured with a condition of a weight of 2.16 kg and a temperature of 235 degrees C. in reference to JIS K7210.

The fire-retardant additive was 1,2-diethyl phosphinic acid aluminum salt prepared by the following method.

2,106 g (19.5 moles) of 1,2-diethyl phosphinic acid was dissolved in 6.5 L of a water. The resultant solution was stirred and mixed with 507 g (6.5 moles) of aluminum hydroxide. The resultant mixture was kept at 80-90 degrees C. for 65 hours.

The mixture was cooled down to 60 degrees C., and filtrated and dried in a vacuum dryer cabinet at 120 degrees C. until the filtered material has a constant mass. The dried material was fine particle powder with weight of 2,140 g. The dried material was not melt at 300 degrees C. The yield was 95 percents of a theoretical value.

An anti-oxidizing agent was hindered phenol compound (Irganox 1010; Product of BASF Japan).

Manufacturing of Flat Cable:

TABLE 1 shows compounding ratios, in parts by weight, of the respective Examples and Comparative Examples. Each mixture was extruded with a biaxial extruder to prepare the respective resin compositions. Each resin composition was extrude-formed to obtain pellets. TABLE 1 also shows a melting point of the respective resin compositions.

TABLE 1

|  | PBT | Fire-Retardant Additive | Anti-Oxidizing Agent | Melting Point (° C.) |
| --- | --- | --- | --- | --- |
| Example 1 | PBT1 100 | 8 | 0.3 | 204 |
| Example 2 | PBT2 100 | 8 | 0.3 | 181 |
| Example 3 | PBT3 100 | 8 | 0.3 | 192 |
| Comparative Example 1 | PBT1 100 | 0 | 0 | 202 |
| Comparative Example 2 | PBT4 100 | 0 | 0 | 224 |
| Comparative Example 3 | PBT4 100 | 8 | 0.3 | 225 |
| Comparative Example 4 | PBT5 100 | 8 | 0.3 | 166 |

Figure 1B:
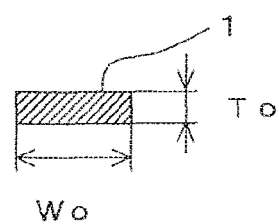

The flat cables of seven resin compositions were prepared with the molding method. FIG. 1A is a sectional view showing the arrangement of conductors 1 in the extruded flexible flat cable A. Six conductors (electrolytic copper) 1 each have a rectangular section (FIG. 1B) with a width 2.0 mm (Wo) and a thickness 0.15 mm (To), and are spaced each other by P (0.5 mm) in the extruded flexible flat cable A. A lengthwise direction of the conductors in the sectional view corresponds to a width of the extruded flexible flat cable.

The conductors 1 arranged parallel to each other were extrude-formed with the extruder at a temperature of 250-300 degrees C. The extruded flexible flat cable A had a dimension with the thickness (T) of 0.6 mm, a width (W) of 15.5 mm and a thickness (S) of an cover layer at the conductor 1 of 0.2 mm.

TABLE 2 shows results of evaluation of formability, flexibility, adhesiveness, fire-retardancy and appearance of Examples 1-3 and Comparative Examples 1-4.

The formability was evaluated about stable ejection of the resin composition and breaking of wire at the extrusion. When the ejection of the resin composition was stable, the extrusion did not cause breaking of the cable and the extruded flexible flat cable was stably manufactured, the formability is evaluated as "Good". When the ejection of the resin composition was unstable or the extrusion caused breaking of the cable, resulting in difficulty of manufacturing the flexible flat cable, the formability is evaluated as "Poor". When the formability of the test specimen was poor, further evaluations were not made.

TABLE 2

|  | Form. | Flex. | Adhe. | Fire-Re. | Appe. | T-Eva. |
| --- | --- | --- | --- | --- | --- | --- |
| Example 1 | Good | Excel | Good | Good | Good | Good |
| Example 2 | Good | Good | GoOd | GoOd | Good | Good |
| Example 3 | Good | Good | Good | Good | Good | Good |
| Comparative Example 1 | Good | Good | Good | Poor | Good | Poor |
| Comparative Example 2 | Good | Poor | Poor | Poor | Poor | Poor |
| Comparative Example 3 | Good | Poor | Poor | Good | Poor | Poor |
| Comparative Example 4 | Poor | ND | ND | ND | ND | Poor |

(Form. = Formability, Flex. = Flexibility, Adhe. = Adhesivness, Fire-Re. = Fire-Retardancy, Appe. = Appearance, T-Eva. = Total Evaluation, Excel = Excellent)

Evaluation of Extruded Flexible Flat Cable:

The flexibility was obtained with a flexibility test, the adhesiveness was obtained with a adhesion test, which evaluates adhesiveness between conductor and insulation layer, the fire-retardancy was obtained with a heat resistance test, and the appearance was obtained with an eye observation.

The flexibility test was made in reference to JIS C60695-11-10A. Flexural fatigue test was made at a temperature of 25±3 degrees C. with a flexural fatigue tester. When the test piece satisfied the flexion cycle at least $15*10^4$ at the flexion radius of 1R=10, it was evaluated that the test piece had an excellent flexibility and indicated by "Excellent", when the flexion cycle was $7*10^4$-less than $15*10^4$ at 1R=10, it was evaluated that the test piece had a sufficient, flexibility and indicated, by "Good", and when the flexion cycle was less than $7*10^4$ at 1R=10, it was evaluated that the test piece had an insufficient flexibility and indicated by "Poor".

The adhesiveness test was made in reference to JIS K6854-2 (peeling test). When the peeling strength at 180 degrees peeling test was at least 40 MPa, it was evaluated that the test piece had an enough adhesiveness and was indicated by "Good", and when the peeling strength was less than 40 MPa, it was evaluated that the test piece had an insufficient adhesiveness and was indicated by "Poor". The low adhesiveness of the flat cable decreases the flexibility, and causes breaking of the cable when the cable is connected between the door and the body of the motor vehicle.

The fire-retardancy was made in reference to ISO 6722. The test piece was horizontally positioned and exposed a flame for 10 seconds and the flame was removed. It was evaluated whether the flame of the flexible flat cable naturally vanished. When the flame disappeared within 30 seconds, it was evaluated that the test piece had an enough fire-retardancy and indicated by "Good", and when the flame was remained after 30 seconds, it was evaluated that the test piece had insufficient fire-retardancy and indicated by "Poor".

The evaluation of appearance was made with the eye observation. When the extruded flexible flat cable was free from distortion, stain, bubble and peeling, it was evaluated that the flat cable had a good appearance and indicated by "Good" in TABLE 2, and otherwise indicated by "Poor".

When the extruded flexible flat cable satisfied all evaluations, the total evaluation of "Good" was given and otherwise "Poor" was given.

TABLE 2 shows that the extruded flexible flat cable of the present invention has the excellent properties about the formability, the flexibility, the adhesiveness and the appearance. The present invention also provides the low cost production of the extruded flexible flat cable with the simple manufacturing.

INDUSTRIAL APPLICABILITY

The extruded flexible flat cable of the present invention is manufactured with the low cost, and has a sufficient durability, lightweight and fire-retardancy.

The extruded flexible flat cable of the present invention has a high productivity and is thus cheap.

The extruded flexible flat cable of the present invention can be utilized in a portion requiring high flexibility with the low price.

The extruded flexible flat cable of the present invention contains the polybutylene telephtalate resin having the high fire-retardancy and durability, and can be utilized in a field of motor vehicle requiring high reliability.

The invention claimed is:

1. An extruded flexible flat cable having a conductor covered with an insulation layer extrude-formed with an extrusion molding method,
   the insulation layer being formed from a fire-retardant resin composition containing a resin composition and a fire-retardant additive,
   the fire-retardant resin composition having a melting point of 170-215 degrees C. measured with a differential thermal analysis at a rate of temperature increase of 10 degrees C. per minute,
   wherein a resin component of the resin composition consists of a modified polybutylene terephthalate,
   wherein the fire-retardant additive consists of organic/inorganic acid, and
   wherein the modified polybutylene terephthalate is a copolymer obtained by copolymerizing a terephthalic acid or its reaction derivative, 1,4-butanediol and a monomer copolymerizable with the 1,4-butanediol.

2. The extruded flexible flat cable as claimed in claim 1, wherein the insulation layer around the conductor is formed with an extrusion molding machine by extruding a single layer of the fire-retardant resin composition around the conductor supplied to a cross head of the extrusion molding machine.

3. The extruded flexible flat cable as claimed in claim 2, wherein the conductor has a thickness of at least 0.1 mm and the flat cable has a flexion cycle of at least $7*10^4$ measured with a flexural fatigue tester at a flexion radius of R=10 and at a temperature of 25 ±3 degrees C.

4. The extruded flexible flat cable as claimed in claim 3, wherein the extruded flexible flat cable is adapted for electrical connection between a movable portion and a stationary portion of a motor vehicle.

5. The extruded flexible flat cable as claimed in claim 2, wherein the extruded flexible flat cable is adapted for electrical connection between a movable portion and a stationary portion of a motor vehicle.

6. The extruded flexible flat cable as claimed in claim 1, wherein the extruded flexible flat cable is adapted for electrical connection between a movable portion and a stationary portion of a motor vehicle.

7. The extruded flexible flat cable as claimed in claim 1, wherein the flexible flat cable has a flame retardancy such that a flame disappears within 30 seconds after the flexible flat cable is exposed to a flame for 10 seconds.

8. The extruded flexible flat cable as claimed in claim 1, wherein the modified polybutylene terephthalate is formed of one of:
   I) a dicarboxylic acid containing terephthalic acid and isophthalic acid with a mole ratio of 87.5/12.5, and 1,4-butanediol as a diol component;
   II) a dicarboxylic acid containing terephthalic acid and isophthalic acid with the mole ratio of 75/25, and 1,4-butanediol as a diol component; and
   III) a combination of I and II in a 1-to-1 weight ratio.

9. The extruded flexible flat cable as claimed in claim 1, wherein the extruded flexible flat cable has a peeling strength of at least 40 MPa at 180°.

10. The extruded flexible flat cable as claimed in claim 1, wherein the fire-retardant additive includes a salt of Ca, Mg and Al of a lower alkyl phosphinic acid.

* * * * *